(12) United States Patent
Matsuyama

(10) Patent No.: US 7,046,645 B1
(45) Date of Patent: May 16, 2006

(54) COMMUNICATION SERVICE SYSTEM AND DEDICATED COMMUNICATION TERMINAL USED IN IT

(75) Inventor: Hiroshi Matsuyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/926,462

(22) PCT Filed: Mar. 8, 2000

(86) PCT No.: PCT/JP00/01405

§ 371 (c)(1),
(2), (4) Date: Nov. 7, 2001

(87) PCT Pub. No.: WO01/67730

PCT Pub. Date: Sep. 13, 2001

(51) Int. Cl.
H04Q 7/00 (2006.01)

(52) U.S. Cl. .................... 370/329; 370/395.21

(58) Field of Classification Search ........ 370/229–235, 370/329–333, 341, 349, 395.21, 395.3, 395.41, 370/395.42; 455/432, 433, 452.1, 453, 422, 455/450
See application file for complete search history.

(56) References Cited

U.S. PATENT DOCUMENTS

| 5,615,249 | A  | * | 3/1997 | Solondz ..................... 455/450 |
| 5,923,737 | A  |   | 7/1999 | Weishut et al. |
| 6,169,898 | B1 | * | 1/2001 | Hsu et al. ................. 455/432.3 |
| 6,556,824 | B1 | * | 4/2003 | Purnadi et al. ............. 455/442 |
| 6,879,834 | B1 | * | 4/2005 | Virtanen ................... 455/452.2 |

FOREIGN PATENT DOCUMENTS

| DE | 198 25 214 | 12/1999 |
| EP | 0 855 823  | 7/1998  |
| JP | 11-18145   | 1/1999  |
| JP | 11-289567  | 10/1999 |

* cited by examiner

Primary Examiner—Dang Ton
Assistant Examiner—Phuc Tran
(74) Attorney, Agent, or Firm—Oblon, Spivak, McClelland, Maier & Neustadt, P.C.

(57) ABSTRACT

In a communication service system, it is possible to hold accumulated utilization information for each of dedicated communication terminals, and to change functions, user interfaces, and/or communication services, for each of the dedicated communication terminals, in response to the accumulated utilization information. This enables optimization of services for each of the dedicated communication terminals in response to each user's utilization status.

9 Claims, 8 Drawing Sheets

COMMUNICATION SERVICE SYSTEM AND DEDICATED COMMUNICATION TERMINAL USED IN IT

This application is the national phase under 35 U.S.C. § 371 of PCT International Application No. PCT/JP00/01405 which has an International filing date of Mar. 8, 2000, which designated the United States of America and was not published in English.

TECHNICAL FIELD

The present invention generally relates to a communication service system comprising: switching centers mutually connected with one another through a communication network; and dedicated communication terminals that establish a communication circuit for communicating with the switching center to perform prescribed communication, and also to the dedicated communication terminal used for the communication service system. More particularly, the present invention relates to a communication service system suitably used for mobile communication in which a unique number such as a telephone number and an IP address (Internet protocol address) is attached to each of dedicated communication terminals to distinguish each of the dedicated communication terminals from the other dedicated communication terminals, thereby enabling voice communication and the like between the dedicated communication terminals based on the distinction established by the attached numbers, and also to the dedicated communication terminal used for the communication service system.

BACKGROUND ART

A mobile communication service system that uses portable phone terminals is a conventional example of a communication service system that attaches an unique number to each of dedicated communication terminals to distinguish each of the dedicated communication terminals from the other dedicated communication terminals, and that is thereby capable of voice communication and data communication between the dedicated communication terminals according to the distinction made by this number.

In recent years, in many countries including Japan, in addition to the voice communication service, various kinds of data communication services, which utilize this mobile communication service system, are becoming commonplace. At the same time, data communication between a World-Wide Web server and a mail server for Internet is also developing. As a result, a portable phone terminal also tends to become multifunctional and to have advanced functions. In addition, for the purpose of meeting demand for various kinds of such communication media, each mobile communication service provider is planning to extend new services using a wideband communication circuit.

Under the circumstances, if all users of portable phone terminals are to be provided with the same service as has been done conventionally, the load imposed on and the efforts required of the following parties concerned increase dramatically. These are users who utilize the service; mobile communication service companies that require key facilities corresponding to the various kinds of services; and, by extension, various manufacturers that provide the hardware according to specifications of the mobile communication service companies. Therefore, considerable impediments to the development of communication industry may arise.

Moreover, apart from such circumstances, differentiation with the other users enables each user to obtain not only real but also psychological satisfaction.

The present invention was devised to solve the problems described above. An object of the present invention is to obtain a communication service system and a dedicated communication terminal used for the system, which can help promote sounder development of communication industry, by reducing loads and efforts of the users, the mobile communication service companies, and the manufacturers, and by enabling the users to obtain not only real but also psychological satisfaction, while meeting demand for various kinds of services in recent years.

DISCLOSURE OF INVENTION

A communication service system according to one variation of the invention comprises:
a plurality of switching centers;
a communication network for connecting the plurality of switching centers with one another; and
a dedicated communication terminal for establishing a communication circuit for communicating with each of the switching centers;
wherein said communication service system holds accumulated utilization information for each of the dedicated communication terminals, and changes functions, user interfaces, and/or communication services, for each of the dedicated communication terminals, in response to the accumulated utilization information.

If such a communication service system is used, it is possible to extend the functions, to change the user interfaces, and moreover, to change communication speed and quality allocation of the functions, for each of the dedicated communication terminals, in response to each user's utilization status.

As a result, while meeting various kinds of service demand in recent years, it is possible to reduce loads put on, and efforts exerted by: all kinds of users from beginners to highly sophisticated users; mobile communication service companies; and manufacturers. What is more, the users can obtain not only real but also psychological satisfaction. By extension, an effect of promoting sounder development of communication industry is produced.

By the way, concerning the invention like this, the holding function and the changing function may be implemented on a network side where there are a plurality of switching centers and a communication network; or those functions may be implemented on a dedicated communication terminal side; or the functions may be shared between both sides appropriately.

The invention further discloses a dedicated communication terminal that establishes a communication circuit for communicating with respective switching centers connected with one another through a communication network, and that performs prescribed communication, said dedicated communication terminal comprising:
a storing means for holding accumulated utilization information of the dedicated communication terminal itself; and
a changing means for changing functions, user interfaces, and/or communication services, for the dedicated communication terminal, in response to the accumulated utilization information.

If such a dedicated communication terminal is used, it is possible to extend the functions, to change the user interfaces, and moreover, to change communication speed and quality allocation for the functions, for each of the dedicated communication terminals, in response to each user's utilization status.

As a result, while meeting various kinds of service demand in recent years, it is possible to reduce loads put on and efforts exerted by users, mobile communication service companies, and manufacturers. What is more, the users can obtain not only real but also psychological satisfaction. By extension, an effect of promoting sounder development of the communication industry is produced.

The invention further discloses a dedicated communication terminal that establishes a communication circuit for communicating with respective switching centers connected with one another through a communication network, and that performs prescribed communication, said dedicated communication terminal comprising:

a plurality of functional counters for counting accumulated utilization information of each function, and for holding the accumulated utilization information;

a level determining means for calculating a weighted sum of values of the plurality of functional counters, and for determining a utilization level of the dedicated communication terminal according to the sum of the values; and a changing means for changing functions, user interfaces, and/or communication services in response to said utilization level.

If such a dedicated communication terminal is used, the functional counters are provided for each function, and the utilization level is determined according to the total utilization status. Therefore, in each of the dedicated communication terminals, in response to each user's utilization status, for the purpose of providing easier utilization of functions, which are especially frequently utilized, the following become possible: extension of the functions; a change in resource allocation; a change in user interfaces; and furthermore, changes in service classes including communication speed and quality of the functions.

As a result, while meeting various kinds of service demand in recent years, it is possible to reduce loads put on, and efforts exerted by users, mobile communication service companies, and manufacturers. What is more, the users can obtain not only real but also psychological satisfaction. By extension, an effect of promoting sounder development of communication industry is produced.

The dedicated communication terminal may comprise:
a level storing means for storing a utilization level; and
a resetting means for resetting count values of the plurality of functional counters when the utilization level increases.

Such a configuration permits a functional counter, having a low number of digits, to be used as each of the functional counters. Therefore increases in the scale of hardware can be kept to a required minimum while maintaining the capability to define the function at a number of levels and fine-tune the service.

In the dedicated communication terminal, the functional counter may be provided for each category of communication services to count traffic in each of the communication services.

If such a configuration is used, in response to the respective utilization status of various communication services such as voice service, mail service, and data communication service, which are required for basic performance of a mobile terminal, the mobile terminal can be individually evolved and developed as a suitable terminal. As a result, an effect of providing an individual user with an easy-to-use terminal is produced.

The dedicated communication terminal may comprise:
a level storing means for storing a utilization level; and
a level input/output means for reading/writing a utilization level from and to said level storing means.

If such a configuration is used, it is possible to notify a user and a communication service provider of the utilization level by means of voice, music, and display when the level is changed. Moreover, it is also possible to download software in relation to a newly available additional function, communication speed, or the like, in response to the notification of this utilization level. Therefore, there is an advantage in that a change in response to the level can be ensured. In addition, the above-mentioned level can be displayed as a current level later on.

At the same time, the utilization level can be reused. As a result, it is possible to allow a user to transport or deal in this utilization level when the user purchases a new terminal; and it is also possible to allow another user to purchase the utilization level as an initial value, in other words, to allow the user to utilize the utilization level as intangible property. Therefore, the users have the following advantages: services, which had been received in the past, can be utilized continuously; and a part or a whole of this utilization level can be purchased as an additional service. Moreover, the communication service provider also has advantages in that this utilization level can be set as an additional service charge separated from a basic charge, or as a promotion-campaign product, so that a mutually convenient system can be built.

The dedicated communication terminal may comprise:
a level storing means that is attached so as to be removable from a main body of the dedicated communication terminal, and that stores a utilization level.

If such a configuration is used, the utilization level can be reused. As a result, it is possible to allow a user to transport or deal in this utilization level when the user purchases a new terminal; and it is also possible to allow another user to purchase the utilization level as an initial value, in other words, to allow the user to utilize the utilization level as intangible property. Therefore, the users have the following advantages: services, which had been received in the past, can be utilized continuously; and this utilization level can be purchased as an additional service. Moreover, the communication service provider also has advantages in that this utilization level can be set as an additional service charge separated from a basic charge, or as a promotion-campaign product, so that a mutually convenient system can be built.

The changing means rearranges, drops, and adds: memory allocation for an additional function; a displaying function; an call incoming notification function; an available function; and quality of communication services.

Such a configuration has an effect of providing the most appropriate service in response to a utilization status of each function for each user.

A communication service system may comprise: a plurality of switching centers; a communication network for connecting the plurality of switching centers with one another; and the above-described dedicated communication terminal for establishing a communication circuit for communicating with each of the switching centers.

BEST METHOD FOR CARRYING OUT THE INVENTION

For the purpose of describing the present invention in further detail, best methods for embodying the invention are described with reference to attached drawings as below.

EMBODIMENT 1

Figure 1:
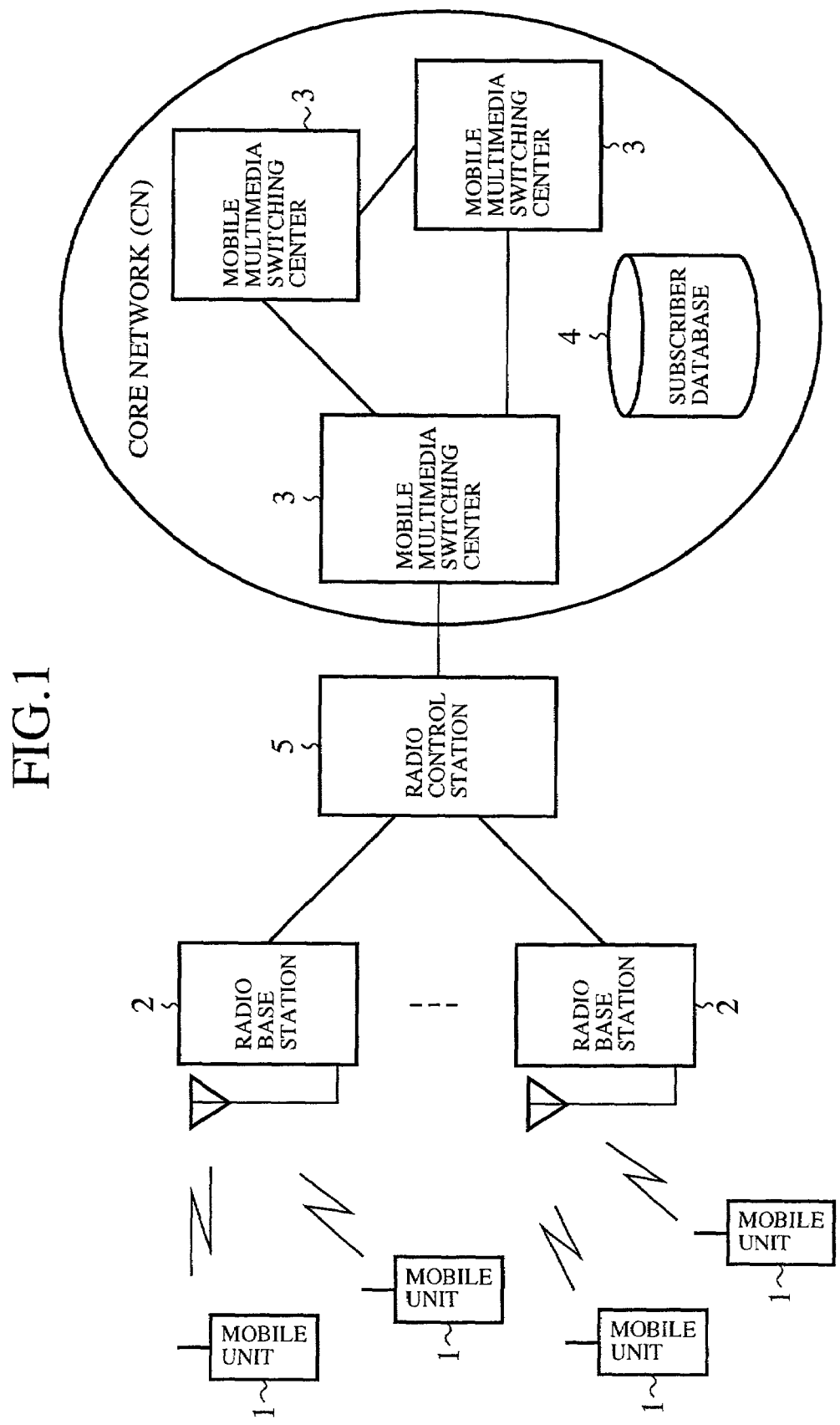
FIG. 1 is a system configuration diagram illustrating a configuration of a communication service system according to an embodiment 1 of the present invention.

FIG. 1 is a system configuration diagram illustrating a configuration of a communication service system according to an embodiment 1 of the present invention. In FIG. 1, each of 1s is a mobile unit (dedicated communication terminal). Each of 2s is a radio base station for transmitting and receiving information by radio to and from each of the mobile units 1. Numerals 3 indicate mobile multimedia switching centers (switching centers) that are mutually connected to constitute a core network of a mobile communication service provider. 4 is a subscriber database that is provided in this core network, and that holds information such as contractual coverage of each subscriber who utilizes each of the mobile units 1 described above. 5 is a radio control station that controls overall communication in the plurality of radio base stations 3 using information in the above-mentioned core network, and the like. In this connection, as this radio control station 5, a radio control station using W-CDMA (wideband code division multiple access method), or the like, can be suitably utilized. The W-CDMA can define service classes (classes such as communication speed and band guarantee) in packet communication and the like.

Figure 2:
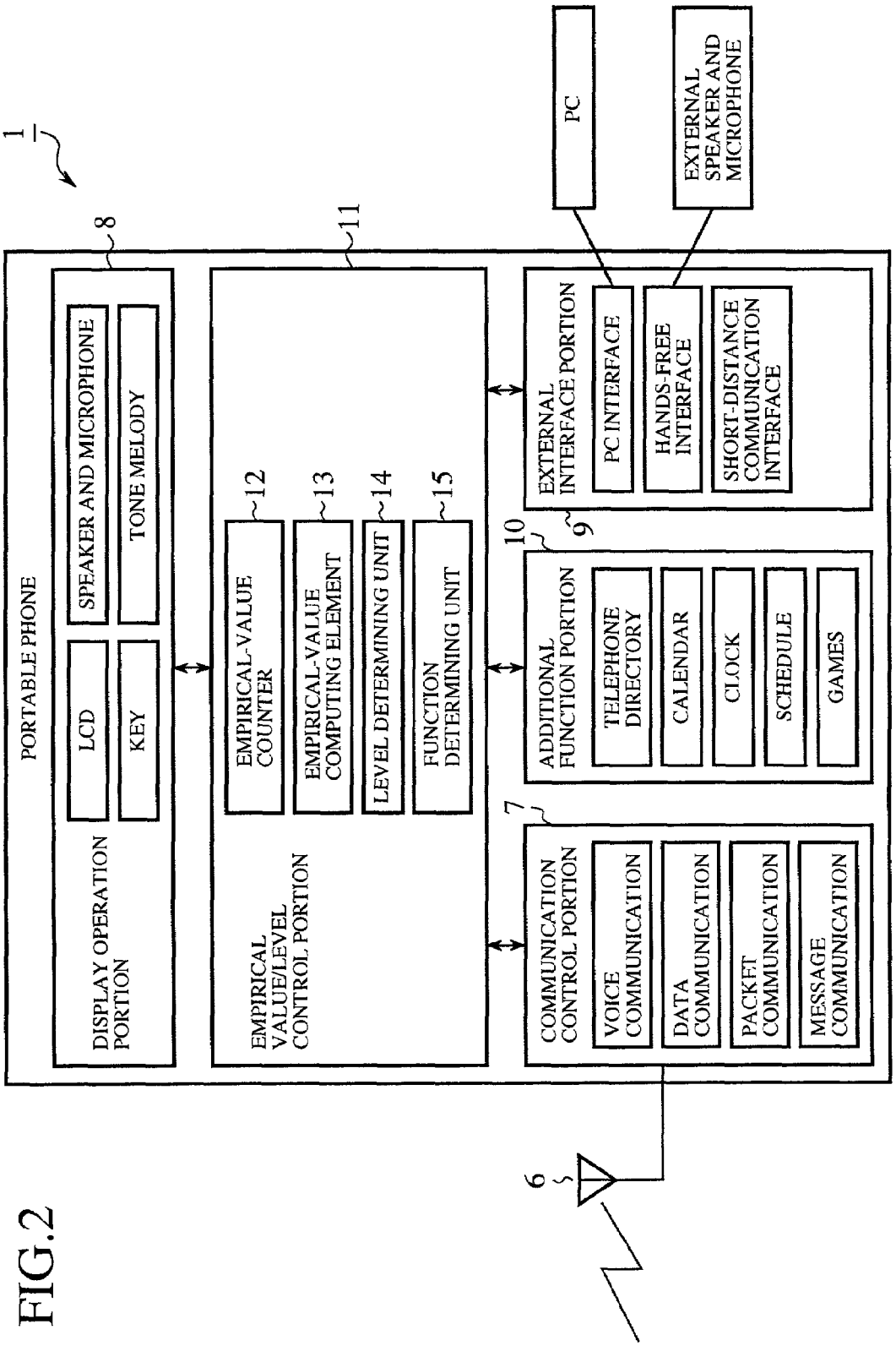
FIG. 2 is a block diagram illustrating a configuration of a mobile unit according to an embodiment 1 of the present invention.

FIG. 2 is a block diagram illustrating a configuration of the mobile unit 1 according to the embodiment 1 of the present invention. In FIG. 2, 6 is an antenna. 7 is a communication control portion for transmitting and receiving communication information in relation to the following services with the radio base station 5 using this antenna 6: voice communication service; data communication service utilized for data communication between the mobile units 1, and the like; packet communication service utilized for connecting to Internet, mail, and the like; and message communication service utilized for message exchange in the mobile communication service provider, and the like. 8 is a display operation portion that has I/O devices such as LCD (liquid crystal device), a speaker, a microphone, a tone melody output device, and keys for inputting alphanumeric and kana characters, and that presents various kinds of information to a user of this mobile unit 1, and that outputs operation input information done by key operation, and the like, in response to the information. 9 is an external interface portion that outputs external input information, and that has the following external I/O devices: a PC (personal computer) interface for performing data exchange with a personal computer PC; a hands-free interface for performing data exchange, in relation to the voice communication service, with a hands-free set comprising an external speaker and a microphone; a short-distance communication interface for performing data exchange with other telecommunication equipment using Bluetooth, infrared communication, or the like. The received information of the communication control portion 7, the operation input information, and the external input information are basically exchanged among the communication control portion 7, the display operation portion 8, and the external interface portion 9 in response to the utilized service, or the like. In addition, 10 is an additional function portion that has a telephone directory, a calendar, a clock, a schedule, games, and the like, and that performs those individual functions in response to the operation input information, or the like.

11 is an empirical value/level control portion comprising: an empirical-value counter for individually counting utilized quantity and a frequency for each of the communication services and for each of the portions 7, 8, 9, and 10 described above; an empirical-value computing element (a storing means, a functional counter) for calculating a weighted sum of the plurality of counted values by weight; a level determining unit (a changing means, a level determining means) for determining a level of the weighted sum and for holding the level; and a function determining unit (a changing means) for determining functions of each of the communication services and each of the portions 7, 8, 9, and 10 described above, and for updating the functions, according to this level, or the like.

Next, the operation of the present invention is described.

Figure 3:
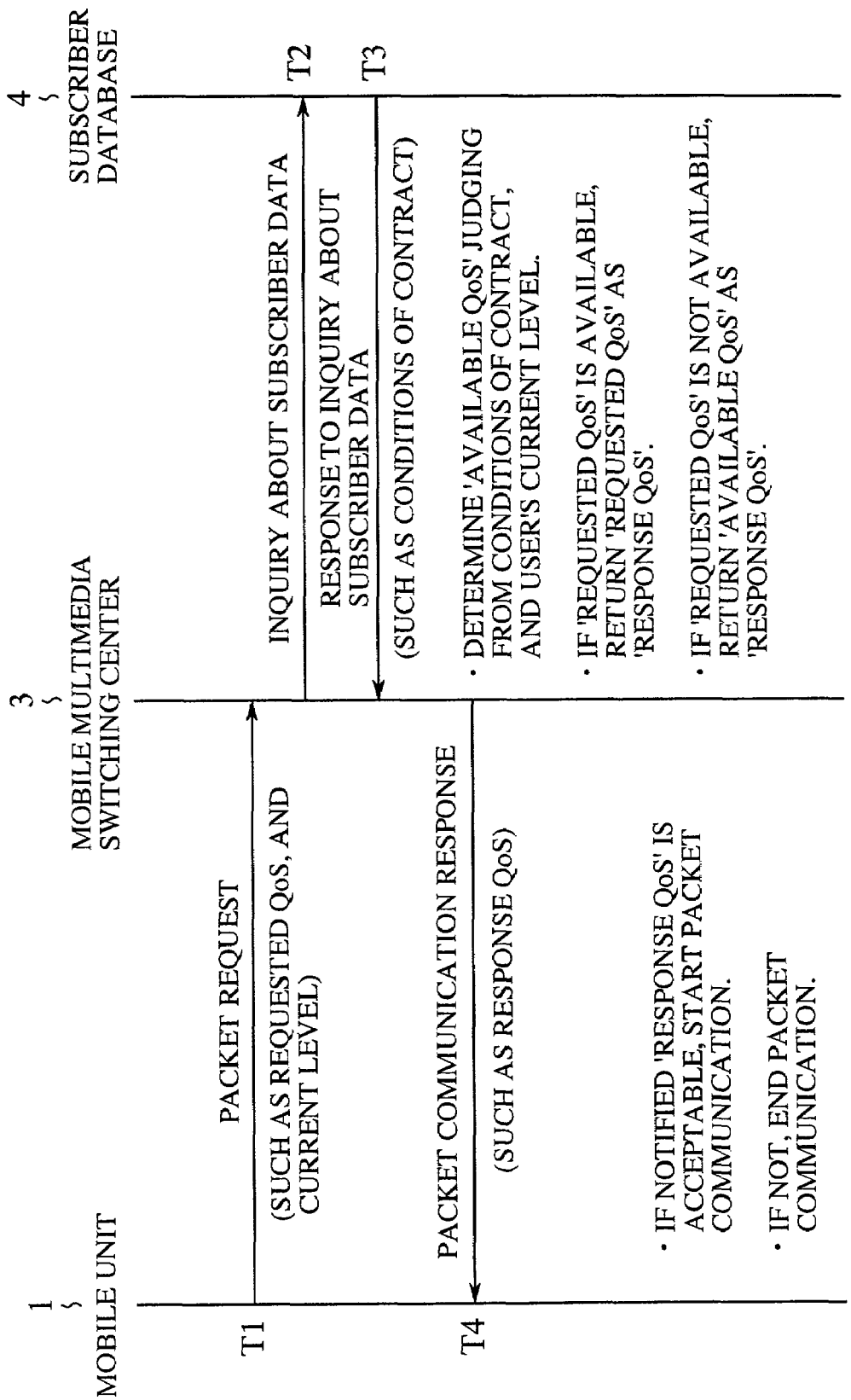
FIG. 3 is a procedure diagram for describing a procedure (W-CDMA method) for establishing a communication circuit in response to a call from a mobile unit by exemplifying a case where a packet communication service is used.

FIG. 3 is a procedure diagram for describing a procedure for establishing a communication circuit in response to a call from the mobile unit 1 (W-CDMA method) by exemplifying a case where the packet communication service is used. In FIG. 3, T1 is a request timing at which the communication control portion 7 outputs a packet communication request to the mobile multimedia switching center 3 in response to an input of an information packet from the display operation portion 8 and the external interface portion 9. On this packet communication request, information about, for example, requested quality of service (QoS) for the packet communication service of this mobile unit 1, a level determined by the level determining unit of the empirical value/level control portion 11, and the like, are superposed.

T2 is inquiry timing at which the mobile multimedia switching center 3 requests the subscriber database 4 to output information required to establish a circuit in response to this packet communication request. In addition, T3 is response timing at which the subscriber database 4 outputs the information in response to this inquiry. By the way, as the information required to establish this circuit, there is information such as contractual coverage of the user of the mobile unit 1 described above.

T4 is response timing at which the mobile multimedia switching center 3 determines service quality allocatable to the mobile unit 1, according to the following: information such as the requested quality of service, the level, and the contractual coverage; a utilization status of the radio base station 5; and the like, and then transmits the service quality to the communication control portion 7 as a packet communication response.

After that, the communication control portion 7 transmits the above-mentioned information packet according to the packet communication response. It is noted for example that if this allocatable quality of service is lower than the requested quality of service, the information packet may not be transmitted. Moreover, in the W-CDMA method described above, service information is also transmitted and received after performing similar circuit establishment processing, for the other service categories including the voice communication service, the data communication service, and the message communication service.

Furthermore, the additional function portion 10 executes additional functions including the telephone directory, and the calendar in response to the information inputted from the display operation portion 8 and the external interface portion 9, and outputs each of the information to the display operation portion 8 and the external interface portion 9.

Figure 4:
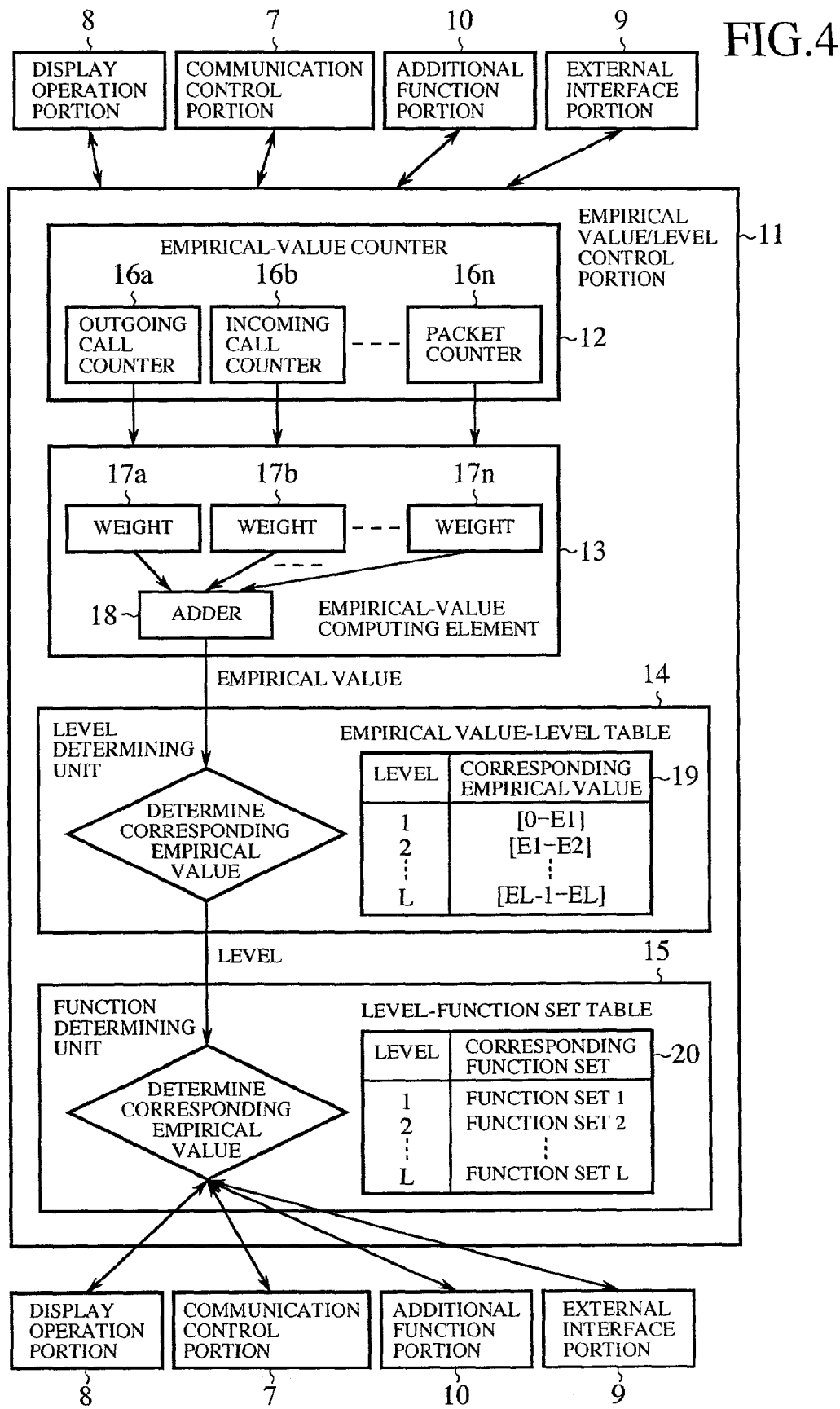
FIG. 4 is an explanatory diagram illustrating a configuration of an empirical value/level control portion according to an embodiment 1 of the present invention, which is arranged according to an information processing procedure.

Next, level determination processing performed in the empirical value/level control portion 11 in response to the various kinds of performed processing is described. FIG. 4 is an explanatory diagram illustrating a configuration of the empirical value/level control portion 11 according to the embodiment 1 of the present invention, which is arranged according to information processing procedure. In FIG. 4, 12 is an empirical-value counter (a storing means and a functional counter). 13 is an empirical-value computing element (a changing means). 14 is a level determining unit (a changing means and a level determining means). 15 is a function determining unit (a changing means). From 16a to 16n are functional counters for counting the following: utilized quantity and a frequency of a function allocated to each functional counter, for example, a number of times of operation and duration of communication for outgoing and incoming calls, mail transmission and reception, contents access, and the like; and traffic such as data quantity of packet communication. From 17a to 17n are weighted multipliers for multiplying count values, from the functional counters from 16a to 16n respectively, by a weighted count. 18 is an adder for adding multiplication outputs of the plurality of multipliers from 17a to 17n. 19 is an empirical-value range table corresponding to each level. 20 is a setting information table for the portions 7, 8, 9, and 10 corresponding to each level.

Each of the portions 7, 8, 9, and 10 has not only a part for performing each basic function, but also a memory and a table for holding the above-mentioned settings. In addition, by writing a function set selected from the above-mentioned setting information table 20 to the memory and the table, the function determining unit 15 performs changing processing such as rearrangement, drop, and addition of the following: for example, memory allocation for the additional function; a displaying function; a call incoming notification function; and an available function; and quality class, data communication speed, capacity, and functions, of communication service.

In addition to the above, the function determining unit 15 can perform the following processing: increasing a number of colors allocated to a display-color conversion table for a LCD so as to increase displayable colors; increasing a number of harmonies and a number of melody sounds (lengths) at the time of incoming call; extending a memory size of a telephone directory; extending a range of accessible contents; and changing a background color and a displayed image at the time of waiting for a call (that is to say, a display screen in response to a level). Among other things, changing the appearance of the mobile unit 1 in this manner to distinguish it from those of other consumers (changing appearance of the mobile unit 1 to a state different from the others in this manner) can improve a level of user's satisfaction. In addition, an antenna or a flip, of which luminous color is different according to a level, a battery pack having a memory (function module), and the like, may be provided separately.

This empirical value/level control portion 11 operates at the following timing: for example, when communication is completed; when power supply is turned off; when each function is completed; or the like. To be more specific, a value of each of the functional counters from 16a to 16n of the empirical-value counter 12 increases only by the used quantity. The weighted multipliers from 17a to 17n multiply the updated counter value by the weighted count. The adder 18 changes only by this new value. The level determining unit 14 compares this added value, which has been changed, with the corresponding empirical-value range table 19, and outputs a level corresponding to the added value. In addition, the function determining unit 15 refers to the setting information table 20, and selects a function set corresponding to the level, and then sets the settings to each of the portions 7, 8, 9, and 10. In this connection, because the level has been output to the mobile multimedia switching center 3 at the time of a circuit establishment request for packet communication, or the like, even if the level is changed in this manner, this switching center 3 side can recognize the level and perform circuit settings in response to the level.

In this manner, determining settings for each function in response to a frequency of utilization, or the like, according to the level permits accumulated utilization information for each mobile unit to be held. In response to the accumulated utilization information, functions, user interfaces, and/or communication services for each of the mobile units 1 can be changed. In each of the mobile units 1, in response to each user's utilization status, the following becomes possible: extension of the functions; a change in the user interfaces; and furthermore, changes in communication speed and quality allocation for the functions. In other words, the more frequently the mobile unit 1 is utilized, the higher service can be provided. Moreover, by suitably setting a growth curve of this level, the user enjoys the improvement of the services as if he or she is playing a game. As a result, utilization can be promoted.

In particular, functional counters from 16a to 16n are provided for each function, and a utilization level is determined according to the total utilization status. Therefore, in each of the mobile units 1, for the purpose of providing easier utilization of functions and communication services, which are especially frequently utilized, it is possible to perform the following in response to each user's utilization status: extension of the functions; a change in resource allocation; a change in user interfaces; and furthermore, changes in service classes including communication speed and quality of the functions.

As a result, the mobile communication service provider can meet all kinds of user's demands from beginners to highly sophisticated users while meeting various kinds of service demands in recent years. What is more, the users can obtain not only real but also psychological satisfaction. By extension, an effect of promoting sounder development of the communication industry is produced. Moreover, it is not necessary for a manufacturer, which has supplied those mobile units 1 and the like according to specifications of this mobile communication service provider, to design a mobile unit by taking a balance between multiple functions with high performance and optimization of limited resources such as a memory (allocation for each function) into consideration as a result of assuming that users utilize all functions equally. Therefore, loads put on and efforts exerted by the manufacturer can also be reduced.

Moreover, limiting and restricting the functions of the mobile unit 1 at first allows each user to have a time period over which the user becomes accustomed to new services and new functions using fixed simple interfaces. Therefore, there is also an advantage in that the user can be trained effectively when the user is provided with new advanced services such as W-CDMA.

By the way, this embodiment 1 has the configuration in which the holding function and the changing function are provided on the side of the mobile unit 1. However, if a level is only determined according to each service type for example, the level may be determined in the radio control station 5, the mobile multimedia switching center 3, or the like; and after that, the level may be held in the subscriber database 4. Additionally, the information may also be held in the mobile unit 1 and the subscriber database 4 by distributing the information appropriately between the two.

EMBODIMENT 2

Figure 5:
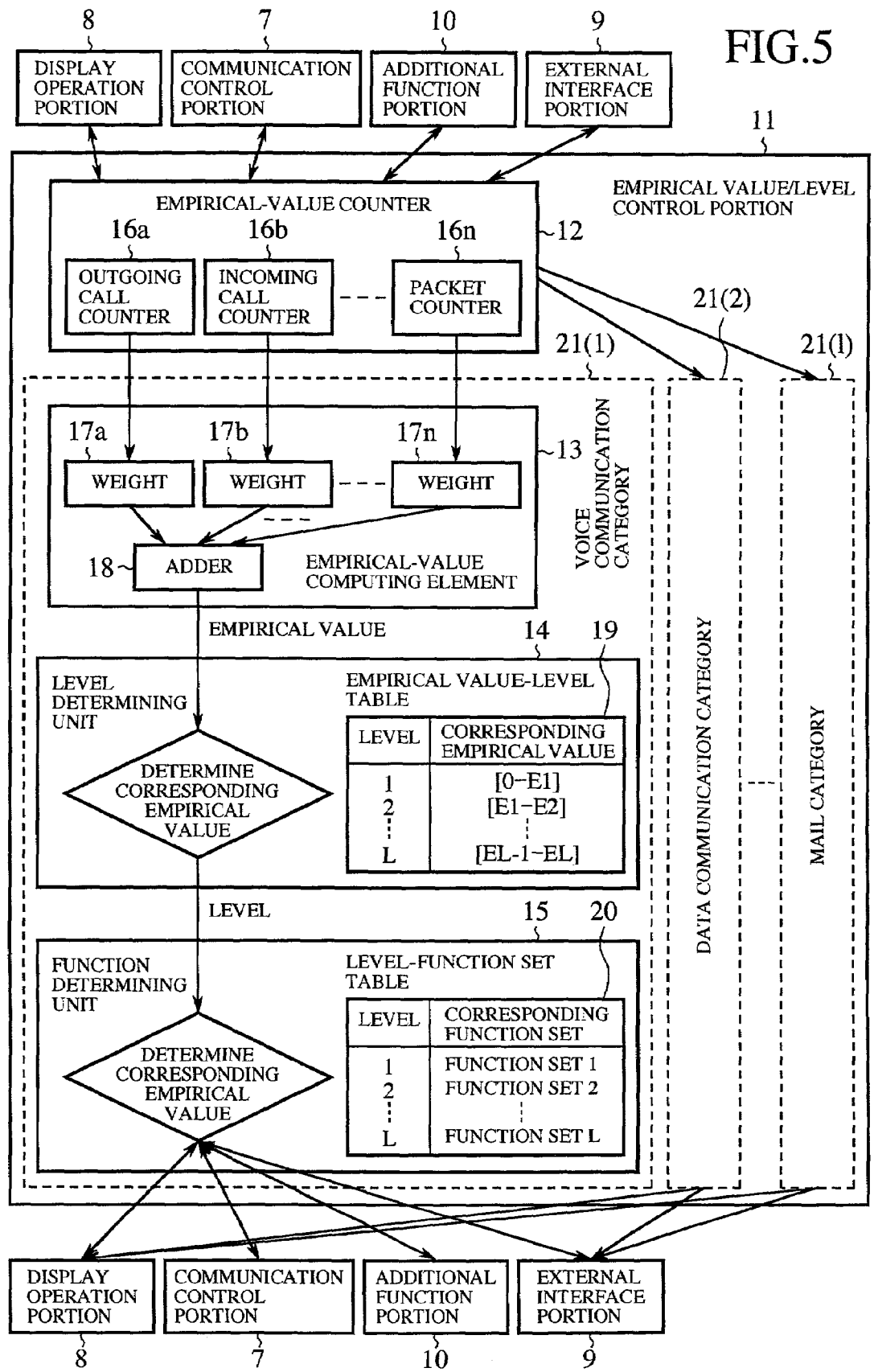
FIG. 5 is an explanatory diagram illustrating a configuration of an empirical value/level control portion according to an embodiment 2 of the present invention, which is arranged according to an information processing procedure.

FIG. 5 is an explanatory diagram illustrating a configuration of the empirical value/level control portion 11 according to an embodiment 2 of the present invention, which is arranged according to an information processing procedure. In FIG. 5, from 21(1) to 21(1) are setting-by-category portions, each of which is provided for each category of communication services including voice communication service, data communication service, packet communication service, and message communication service, and each of which has the empirical-value computing element 13, the level determining unit 14, and the function determining unit 15. In addition, the empirical-value counter 12 is provided with the functional counters from 16a to 16n. Each of the categories has an associated set of the functional counters 16a, ..., 16n.

Each of the setting-by-category portions from 21 (1) to 21 (l) determines a level by referring to count values of the functional counters from 16a to 16n, which should be taken into consideration, at the time when utilization of each function is finished, or the like. After that, each of the setting-by-category portions makes settings for each of the portions 7, 8, 9, and 10 in response to the level. Configuration and operation other than those described above are similar to the embodiment 1. Therefore, additional description is omitted.

As described above, according to this embodiment 2, the functional counters from 16a to 16n are provided for respective functions so as to make the level of utilization of each communication service available to the portions 21(1)–21(l). Utilization level is individually determined in response to a utilization status for each function. Therefore, it is possible to perform the following: extension of the functions; a change in resource allocation; a change in user interfaces; and furthermore, changes in service classes including communication speed and quality for the functions in each of the mobile units 1, in response to each user's utilization status of each category, for the purpose of providing easier utilization of functions and communication services, which are especially frequently utilized. As a result, the mobile unit 1 is more adapted for utilized functions so that the user is provided with the mobile unit 1 that can be used more easily. Moreover, a level of satisfaction also increases. Furthermore, mapping of the services and the functions with the levels can also be performed easily by changing the weighted count, which permits an arbitrary growth curve to be set easily.

EMBODIMENT 3

Figure 6:
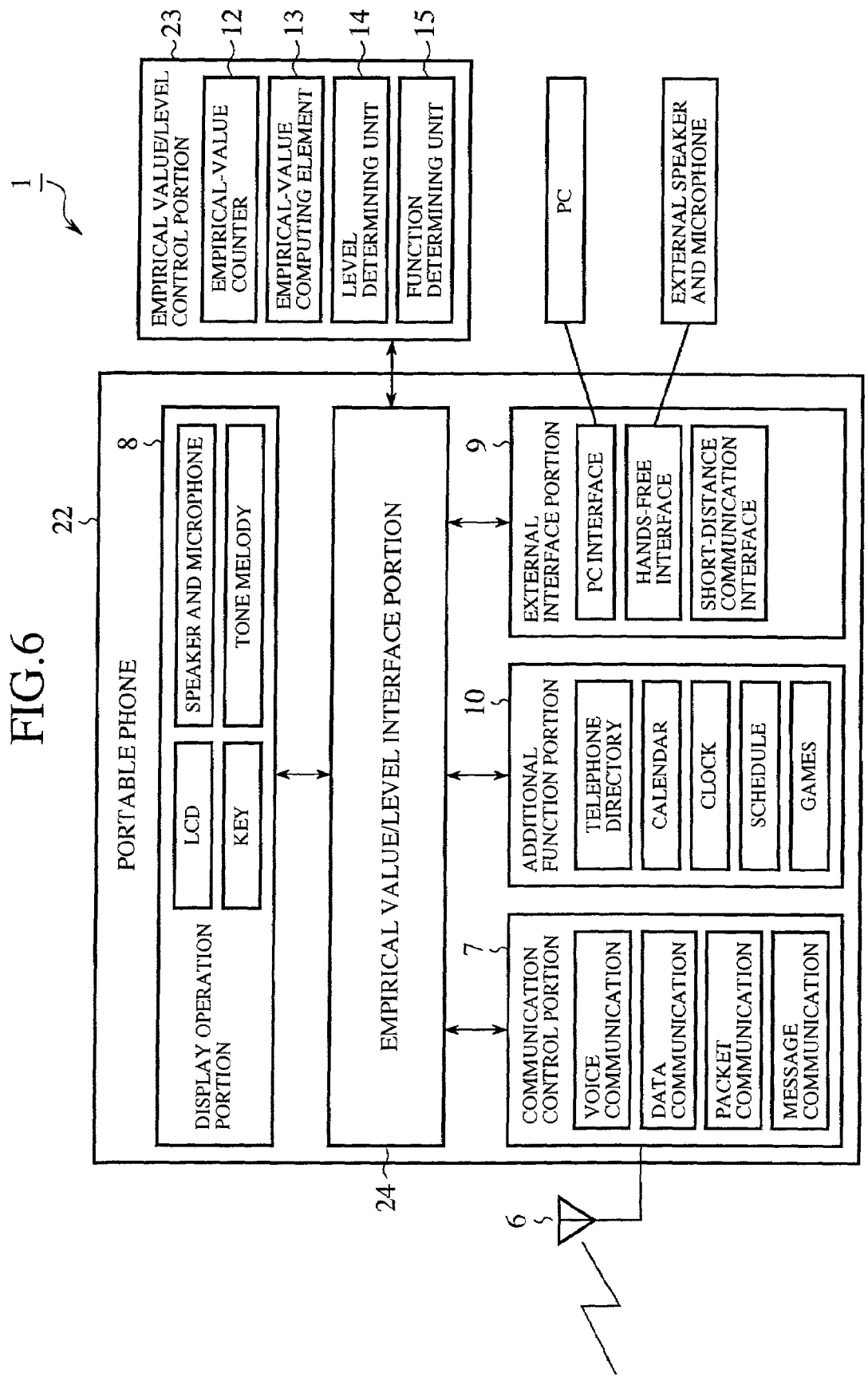
FIG. 6 is a block diagram illustrating a configuration of a mobile unit according to an embodiment 3 of the present invention.

FIG. 6 is a block diagram illustrating a configuration of the mobile unit 1 according to an embodiment 3 of the present invention. In FIG. 6, 22 is a main body housing of the mobile unit 1. 23 is a removable empirical value/level control portion that is attached to this main body housing 22 so as to be removable, and that has the empirical-value counter 12, the empirical-value computing element 13, the level determining unit 14, and the function determining unit 15. 24 is an empirical value/level interface portion (a level input/output means) that operates this removable empirical value/level control portion 23, and that establishes an information exchange channel between this removable empirical value/level control portion 23 and each of the other portions 7, 8, 9, and 10, at the following timing: for example, when communication is completed; when power supply is turned off; when each function is completed; or the like. A configuration and each of the portions other than those described above are similar to the embodiment 2. Therefore, additional description is omitted.

If such a configuration is used, when purchasing a new terminal or the like, a utilization level can be reused by simply attaching this removable empirical value/level control portion 23 to a new mobile unit at that time. Moreover, separately supplying the removable empirical value/level control portion 23, in which a utilization level is written beforehand, provides the user with the mobile unit 1 that meets user's requests, and that is suitable for a user's level. This is another effect produced by this configuration.

EMBODIMENT 4

Figure 7:
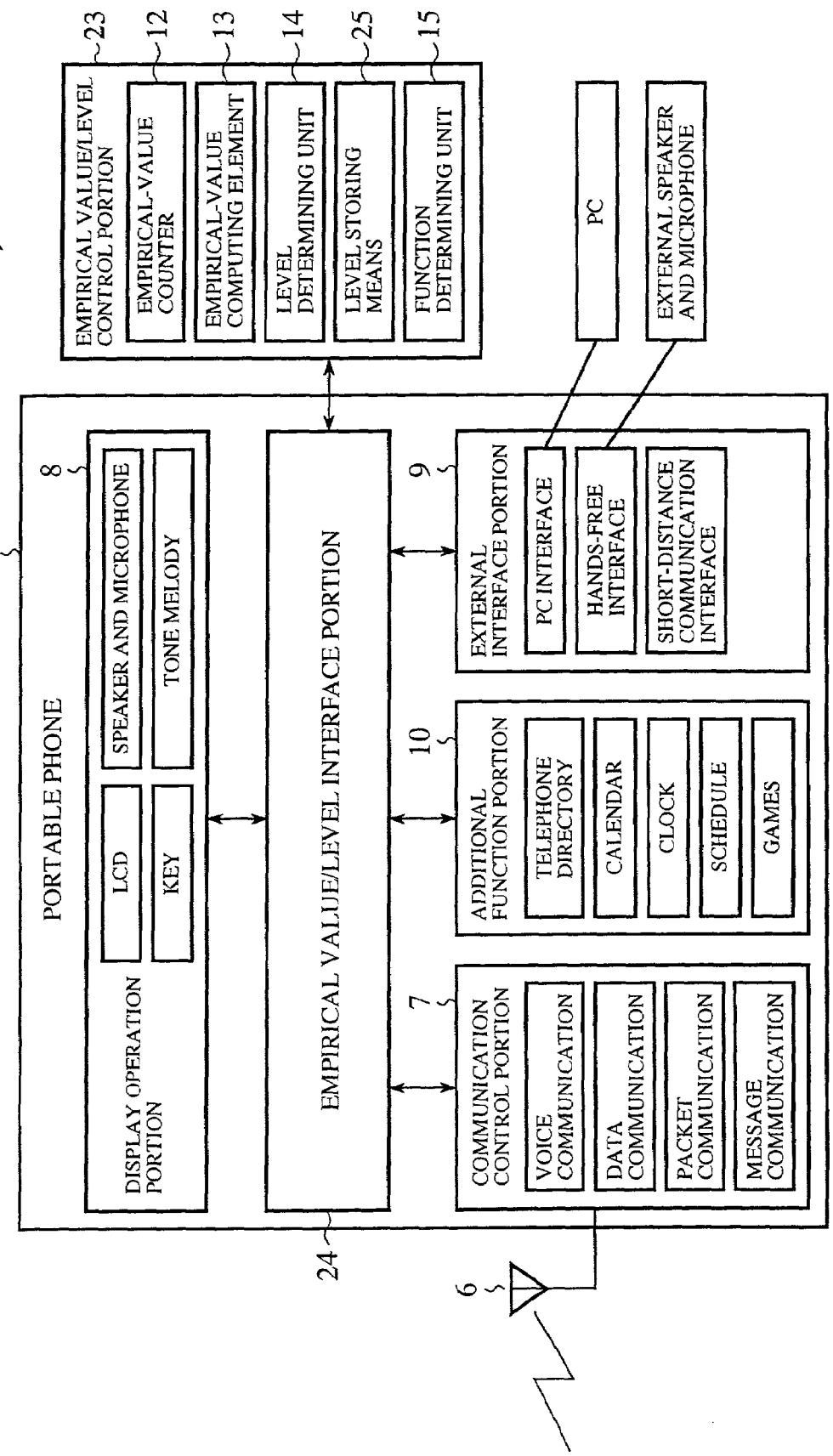
FIG. 7 is a block diagram illustrating a configuration of a mobile unit according to an embodiment 4 of the present invention.

FIG. 7 is a block diagram illustrating a configuration of the mobile unit 1 according to an embodiment 4 of the present invention. In FIG. 4, 25 is a level storing means that holds a level determined by the level determining unit 14, and that outputs the level in response to reading from the other portions 7, 8, and 9 including the display operation portion, and that holds a new level in response to writing from the other portions 7, 8, and 9 including the display operation portion. When the level of this level storing means 25 is changed, the function determining unit 15 changes settings of each of the portions 7, 8, 9, and 10 according to the change. Configuration and operation other than those described above are similar to the embodiment 4. Therefore, description is omitted.

If such a configuration is used, not only displaying a present level, and transporting the level between units belonging to the same user, but also the following become possible: purchasing and selling the level as intangible property; setting an additional service charge separately from a basic charge; notifying the user of a utilization level by voice, music, or display when the level is changed; and notifying the other mobile units 1 of the level. Therefore, the configuration has an effect of giving the user great satisfaction psychologically as well as in fact.

In particular, because the level can be read and written through the communication control portion 7, it is possible to notify a communication service provider of the utilization level by voice, music, and display when the level is changed; and it is also possible to extend various kinds of services by utilizing the reported level. For example, the following become possible: from the radio control station 5, the mobile multimedia switching center 3, or the like, in response to a notification of this utilization level, downloading software in relation to newly available additional functions and communication speed, and the like, automatically or arbitrarily; downloading additional function software automatically and arbitrarily; in the radio control station 5, the mobile multimedia switching center 3, or the like, setting a promotion-campaign product (a bonus-level give-away, and a give-away in response to a level, and the like); and in response to user's utilization status, extending various kinds of additional services including discount service in response to a notified level, various kinds of message transmission services, empirical value ranking service, and give-away service and cash-back service by point conversion of a level (electronic money service). Therefore, effective services can also be extended on the communication service provider side. Accordingly, high-level users are provided with advanced services reaching a high satisfaction level, which cannot be provided by the other communication service companies. As a result, a satisfaction level of sophisticated users is further increased.

In addition, as another effect, downloading the function in this manner permits memory capacity required for the mobile unit 1, and the like, to be reduced, which effectively keeps a price of the mobile unit from increasing.

EMBODIMENT 5

Figure 8:
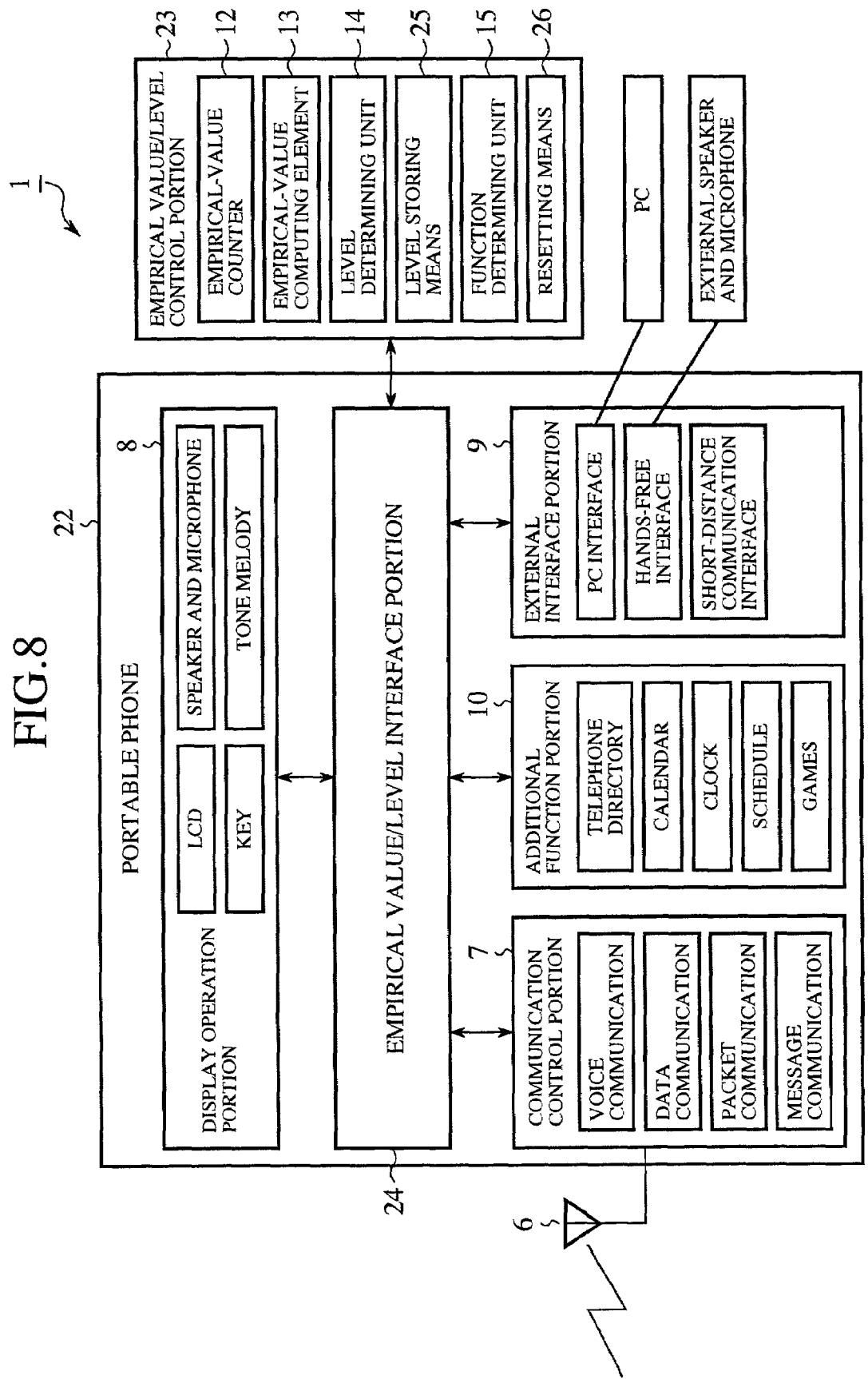
FIG. 8 is a block diagram illustrating a configuration of a mobile unit according to an embodiment 5 of the present invention.

FIG. 8 is a block diagram illustrating a configuration of the mobile unit according to an embodiment 5 of the present invention. In FIG. 8, 26 is a resetting means for resetting the functional counters from 16a to 16n of the empirical-value counter when a determination level changes in the level determining unit 14. The level determining unit 14 determines the next level according to this reset value. Configurations and operations other than those described above are similar to the embodiment 4. Therefore, additional description is omitted.

If such a configuration is used, as each of the functional counters from 16a to 16n, a functional counter, having a low number of digits can be used. This produces an effect of controlling an increase in a hardware scale to a required minimum, while providing a high level of service by setting functional setting stages in detail.

INDUSTRIAL APPLICABILITY

As described above, the communication service system according to the present invention holds accumulated utilization information for each dedicated communication terminal, and changes functions, user interfaces, and/or communication services, for each of the dedicated communication terminals, in response to the accumulated utilization information. Therefore, optimization of services can be achieved for each of the dedicated communication terminals in response to each user's utilization status. For this reason, the communication service system according to the present invention is suitable for communication services, which use a next-generation wideband communication circuit, and the like.

The invention claimed is:

1. A communication service system comprising:
   a plurality of switching centers;
   a communication network configured to connect the plurality of switching centers with one another;
   a dedicated communication terminal configured to establish a communication circuit for communicating with each of the switching centers; and
   a plurality of functional counters configured to count accumulated utilization information of the functions of the dedicated communication terminal, and configured to hold the accumulated utilization information,
   wherein said communication service system changes functions for the dedicated communication terminal, in response to the accumulated utilization information, wherein
   the functions include at least one of a user interface, communication service, external input/output devices operation, or local data exchange function.

2. A dedicated communication terminal configured to establish a communication circuit for communicating with respective switching centers connected with one another through a communication network, the communication network configured to perform prescribed communication, said dedicated communication terminal comprising:
   counting means configured to count accumulated utilization information of the functions of the dedicated communication terminal;
   a storing means for holding accumulated utilization information of the dedicated communication terminal itself; and
   a changing means for changing the functions for the dedicated communication terminal, in response to the accumulated utilization information, wherein
   the functions include at least one of a user interface, communication service, external input/output devices operation, or local data exchange function.

3. A dedicated communication terminal configured to establish a communication circuit for communicating with respective switching centers connected with one another through a communication network, and configured to perform prescribed communication, said dedicated communication terminal comprising:
   a plurality of functional counters configured to count accumulated utilization information of each function, and configured to hold the accumulated utilization information;
   a level determining means configured to calculate a weighted sum of values of the plurality of functional counters, and configured to determine a utilization level of the dedicated communication terminal according to the sum of the values; and
   a changing means configured to change functions, user interfaces, and/or communication services in response to said utilization level.

4. A dedicated communication terminal according to claim 3, comprising:
   a level storing means configured to store a utilization level; and
   a resetting means configured to reset count values of the plurality of functional counters when the utilization level increases.

5. A dedicated communication terminal according to claim 3, wherein the functional counter is provided for each category of communication services to count traffic in each of the communication services.

6. A dedicated communication terminal according to claim 3, comprising:
   a level storing means configured to store a utilization level; and
   a level input/output means configured to read and write a utilization level from and to said level storing means.

7. A dedicated communication terminal according to claim 3, comprising:
   a level storing means that is attached so as to be removable from a main body of the dedicated communication terminal, and configured to store a utilization level.

8. A dedicated communication terminal according to claim 3, wherein the changing means is configured to rearrange, drop, and add: memory allocation for an additional function; a displaying function; an call incoming notification function; an available function; and quality of communication services.

9. A communication service system comprising: a plurality of switching centers; a communication network configured to connect the plurality of switching centers with one another; and a dedicated communication terminal configured to establish a communication circuit for communicating with each of the switching centers;
   said dedicated communication terminal comprising:
      a plurality of functional counters configured to count accumulated utilization information of each function by function, and configured to hold the accumulated utilization information;
      a level determining means configured to calculate a weighted sum of values of the plurality of functional counters, and configured to determine a utilization level of the dedicated communication terminal according to the sum of the values; and
      a changing means configured to change functions, user interfaces, and/or communication services in response to said utilization level;
   wherein each of the switching centers is configured to allocate a circuit in response to the level that has been transmitted from the dedicated communication terminal.

* * * * *